Patented Oct. 27, 1925.

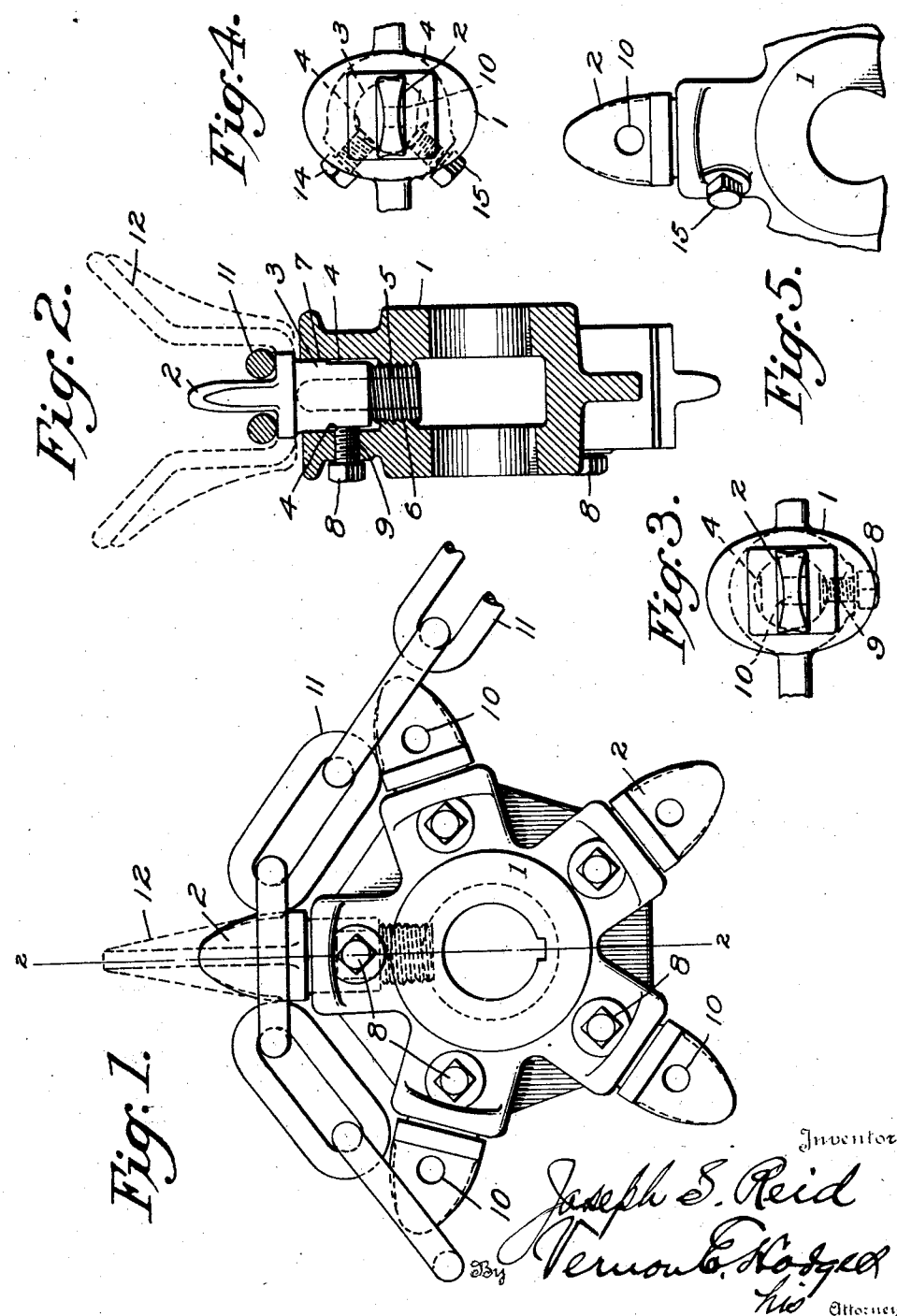

1,559,375

UNITED STATES PATENT OFFICE.

JOSEPH S. REID, OF OLEAN, NEW YORK, ASSIGNOR TO CLARK BROTHERS COMPANY, OF OLEAN, NEW YORK, A CORPORATION OF NEW YORK.

CHAIN WHEEL.

Application filed January 24, 1922. Serial No. 531,365.

*To all whom it may concern:*

Be it known that I, JOSEPH S. REID, a citizen of the United States, residing at Olean, in the county of Cattaraugus and State of New York, have invented certain new and useful Improvements in Chain Wheels, of which the following is a specification.

My invention relates to an improvement in chain wheels for cable chains.

The purpose of this invention is to provide a simple means for adjusting the pitch and this is done by arranging the teeth so that by giving them a part turn in the socket they may be adjusted either in or out, and means is provided for locking the teeth securely in the wheel when thus adjusted.

In the accompanying drawings:

Figure 1 is a side view.

Figure 2 is a section on the line 2—2 of Figure 1,

Figure 3 is a fragmentary end view looking down from the top of one of the teeth and Figures 4 and 5 show a slightly modified construction.

The numeral 1, represents the body portion of the wheel usually cast from grey iron stock of the best quality.

The numeral 2 indicates the teeth of which there are usually five in a wheel of this type.

Various plans have been devised for the adjustment of these teeth for wear. For instance, simple wedge bolts have been used with nuts for drawing this wedge bolt laterally through the hole in the shank of the tooth. Adjusting screws have been employed. But my present invention is an improvement on these different methods and is very simple as will be explained.

Each tooth has a shank, a portion 3, of which is cylindrical and provided with flats 4, of which there are two shown, for the shank of each tooth. These are diametrically opposite each other as shown in Figures 2 and 3.

The extreme inner end of the shank is provided with threads 5, which screw into the corresponding threads 6, in the inner end of the bores 7, of the wheel.

Lock screws 8, of which there is one for each adjustable tooth are screwed into a threaded hole 9, in the stock of the wheel and its inner end engages one of the flats 4, of the shank of the adjusted tooth.

When it is desired to adjust one of these teeth, the lock screw is turned back, the tooth is given a half turn by applying a wrench or inserting a tool through the hole 10, with which each tooth is provided.

In this simple manner the tooth may be adjusted in or out by turning it to the right or left either a half turn of a full turn or more than a full turn, if desired.

After being adjusted the lock screw 8, is screwed into the flat 4, opposite as shown in Figure 3.

The usual cable chain 11, is carried on the teeth of the wheel and teeth may be used with wings 12, if desired, as indicated by the dotted lines in Figures 1 and 2.

As a wheel of this character sustains a large amount of strain and punishment, the parts must be strong and rigid and by means of the construction set forth and elements and arrangements described, this has been fully accomplished in a simple and effective manner.

As shown in Figs. 4 and 5 two set screws 14 and 15 might be employed, instead of one. These set screws would be located one on each side of the body of the wheel at such an angle as to force the shank of the tooth back against that side of the hole which makes the chain pull that comes against the tooth.

I claim:

A chain wheel including a hub, a plurality of integral radial projections extending outwardly therefrom, each of said projections having a radial bore therein extending into the hub, said bore being smooth at the outer end and threaded only at the inner end thereof, adjustable teeth, each having a cylindrical shank provided with a flattened portion, the inner end only of which shank is threaded to turn in the threaded portion at the inner end of the corresponding bore, the smooth outer end of each shank being closely fitted to the smooth outer end of the bore and supported laterally thereby, and locking screws extending into the sides of the radial projections and engaging the flattened portions of the shanks of the teeth for locking the latter in their adjusted positions.

In testimony whereof I affix my signature.

JOSEPH S. REID.